United States Patent
Barber-Perez et al.

[11] 3,802,333
[45] Apr. 9, 1974

[54] APPARATUS FOR FUMIGATION UNDER VACUUM OF GRANULATED FOODSTUFFS

[75] Inventors: Salvador Barber-Perez; Ramon Cerni-Bisbal, both of Valencia, Spain

[73] Assignee: Patronato de Investigacion Cientifice y Tecnica "Jaun de la Cierva" Del Consejo Superior de Investigaciones Cientificas, Madrid, Spain

[22] Filed: Mar. 4, 1971

[21] Appl. No.: 120,925

[30] Foreign Application Priority Data
Mar. 6, 1970 Spain .................................. 377224

[52] U.S. Cl. ..................................... 99/472, 99/225
[51] Int. Cl. .............................................. A23l 3/00
[58] Field of Search ............ 99/258, 271, 269, 270, 99/153, 225, 472, 467, 473

[56] References Cited
UNITED STATES PATENTS
| | | | |
|---|---|---|---|
| 1,910,793 | 5/1933 | Guinan | 99/472 |
| 2,179,327 | 11/1939 | Evans | 99/472 |
| 2,351,853 | 6/1944 | Graham | 99/472 |
| 334,967 | 1/1886 | Murray | 99/270 |
| 3,096,181 | 7/1963 | Dixon | 99/269 |

*Primary Examiner*—Robert W. Jenkins

[57] ABSTRACT

A process of fumigation with homogenization and activation of the inter- and intra-granular atmosphere, and the installation for the carrying-out of such process, the said process essentially consisting of subjecting the products to be fumigated to appropriate vacuum conditions during a determined period in a phase prior to fumigation, thus achieving a homogenization of the inter- and intra-granular atmosphere and an activation of the respiratory capacity of the insects concerned. The installation necessary to apply the process in accordance with the present invention consists, in general terms, of one or more metal recipients of large capacity, each one of which is provided with orifices or mouths for loading and unloading, in addition to others for connections of vacuum conduits, of ventilation-recirculation and of injection of the fumigant.

3 Claims, 1 Drawing Figure

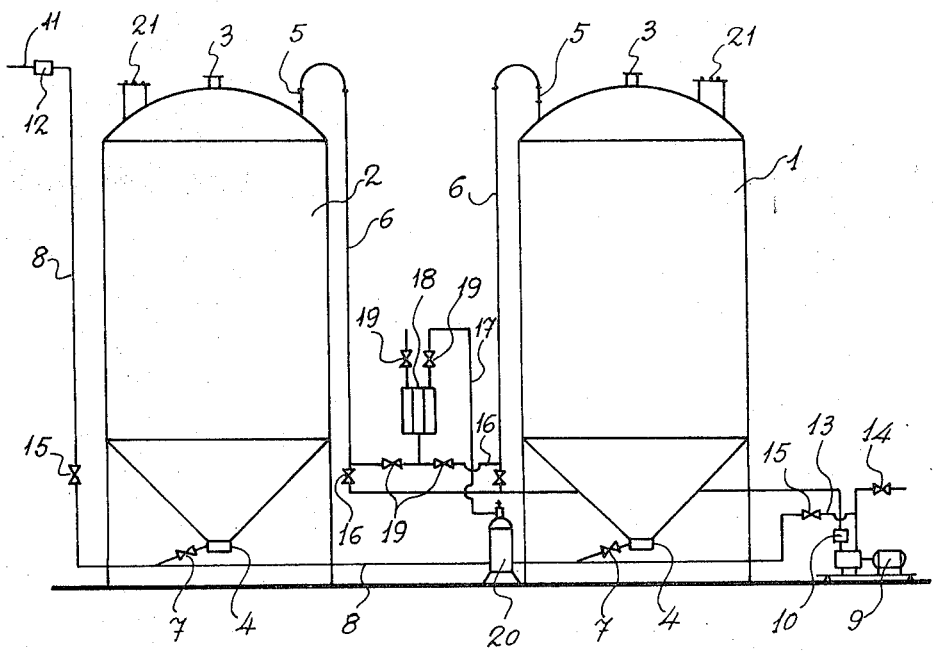

APPARATUS FOR FUMIGATION UNDER VACUUM OF GRANULATED FOODSTUFFS

The process of fumigation in accordance with the present invention has been specially conceived to be applied to cereals, pulses, grains, granular foodstuffs, such as those used for animals, etc., and to ensure the conservation of such products by avoiding the proliferation of insects and micro-organisms, which will be destroyed even though they are found in the interior of the grain. Among this general range of applications, there is envisaged the special and preferential application of the process in question to processed white rice, since this is a product that requires a high degree of protection.

The process that we are about to describe consists essentially of subjecting the products to be fumigated to appropriate vacuum conditions during a determined period in a phase prior to fumigation. There is thus achieved a homogenization of the inter- and intra-granular atmosphere, and an activation of the respiratory capacity of the insects concerned. In this way the fumigant is uniformly distributed through the whole of the inter-granular space, establishing intimate contact with the product and even penetrating into each grain. The homogenization of the gas atmosphere in storage containers is additionally favoured by means of a system of recirculation. The efficacy of the treatment is considerably increased due to the homogenization of the atmosphere in the storage containers, and to the activation of the respiratory capacity of the insects which ingest larger amounts of fumigant.

The installation necessary to apply the process in accordance with the invention consists, in general terms, of one or more metal recipients of large capacity, each one of which is provided with orifices or mouths for loading and unloading, in addition to others for connections of vacuum conduits, of ventilation-recirculation and of injection of the fumigant.

With the aim of making the object of the invention more comprehensible, and only by way of example, there is annexed a sheet of drawings on which there is illustrated the general diagram of a practical implementation of the installation for vacuum fumigation which is advocated herein.

In the said diagram, and in the following description, the principal elements and their constituent parts have been designated in accordance with the following nomenclature:

1. Metal recipient
2. Metal recipient
3. Loading mouth
4. Discharge valve
5. Upper flange
6. Vacuum conduit
7. Spherical valve and lower flange
8. Ventilation conduit
9. Electro-pump
10. Dry filter
11. Free end of the conduit 8
12. Dry filter
13. End of the conduit 8
14. Outlet valve of the electro-pump 9
15. Spherical valves
16. Vacuum opening and closing valves
17. Fumigant conduit
18. Vapourizing and measuring element
19. Membrane valves
20. Bottle of fumigant
21. Manhole On referring to the above-mentioned diagram, it may be seen that in this case, the installation consists of two metal recipients 1 and 2, of high capacity and, preferably, of cylindrical form, being closed at the upper part by means of a spherical element, while the lower part adopts the form of a cone. Each of the upper spherical elements carries a loading mouth 3 with a hermetic closure, and a manhole 21 that permits access for the purpose of cleaning the interior of the recipient, while at the same time the minor base of the lower frustum-conical definition includes a discharge valve 4, also fitted with a hermetic closure, through which there may be transported the products treated to the hopper or hoppers of the packing or bagging machine or machines (not shown). At its upper part, each metal recipient 1 and 2 has a flange 5 solidly united with it for the connection of the vacuum conduit 6 and at its lower part, another flange 7 with its spherical valve for the connection of the ventilation conduit 8.

The vacuum conduit 6 is common to the two recipients 1 and 2 through the corresponding ramifications, which have inserted in them the vacuum opening and closing valves 16. From this conduit aspiration is produced by an electro-pump 9 protected by a dry filter 10 the purpose of which is to trap the dust.

The ventilation and/or recirculation conduit 8 is likewise common to the two containers 1 and 2. One of the ends 11 is directly related to the exterior by means of a dry filter 12 which permits the entry of aseptic air, while the opposite end 13 communicates with the outlet 14 of the electro-pump 9 which produces the vacuum. Both ends 11 and 13 are supplied with spherical valves 15.

The ventilation and recirculation of the installation is produced by means of the electro-pump 9, by appropriately combining the opening or closing of the valves of the said conduits 8 and 6, of which the first operates as an outward channel, while the second operates as a return channel.

The conduit 17 is destined for the injection of fumigants into the containers 1 and 2, and consists of a measuring-vapourizing element 18 combined with membrane valves 19, of selective connection to the vacuum conduits 6 linked with a bottle of fumigant 20.

With an installation such as that described, the process of vacuum fumigation is effected in the following manner:

The product to be fumigated is poured into the containers 1 and/or 2 through the loading mouth 3 which is hermetically closed after which, by means of the pump 9, the interior air is extracted until an appropriate vacuum is produced. This vacuum is maintained for a determined period of time which, according to the product to be treated, lies between 15 minutes and 2 hours, after which the fumigant (preferably methyl bromide) is injected; after each injection there is effected, in the first place, a recirculation of the interior gas or atmosphere of the recipients for a certain time that ensures a determined number of changes of the said gas or atmosphere. The fumigant is kept static for a period of between 15 minutes and 5 hours, which period always depends upon the nature of the product to be fumigated, after which the operation of ventilation is initiated in order to remove the gas, there thus being completed the fumigation treatment.

The products fumigated can be discharged directly and gradually through aseptic conduits to the storage recipients or to the hoppers of the packing or bagging machines, with the purpose of avoding a new contamination.

Following upon this exposition, the purpose aimed at by the subject of the invention having been made clear, stress is laid on the advantages that are derived from the industrial application of the process, from among which advantages we cite the following as being the most important:

1. Simplicity of the process of fumigation and, consequently, an installation for its practical employment which has been so simplified that it can be perfectly adapted to any industrial line of continuous processing of rice or other cereals, grains, pulses, etc., which fact determines very acceptable overheads.
2. Very simple assembly, facilitated by the mechanical organization of the fumigation device, which permits a rapid coupling which can even be carried out by unskilled labour, which advantage is reflected by important savings of time and energy.
3. Continuity in the processing operation, which avoids wastage or bottle-necks in the productivity of the mill or industry with which the fumigation installation is connected.
4. A notable reduction in the labour force to be used in the process of fumigation, since the operations of filling and emptying the storage recipients are automatic, and, in general, the installation is operated by a single worker.
5. Total destruction of insects and parasites at all stages of growth, even when they are found in the interior of the grain.
6. The bringing-about of long-duration preservation of the products treated, even when, after treatment, they are stored in unfavourable conditions.
7. Functional novelty facilitated by a process of operations carried out on the basis of pneumatic currents appropriately directed by valve complexes which make use of the said currents for the purpose proposed, and which constitute an important advance in the technique applied to the fumigation of cereals.

In the process and installation described hereinbefore, there may be considered as variable all those circumstances that do not suppose an alteration in the essence of the purpose expounded in the foregoing description, which latter should be taken in its widest sense, and not interpreted as a limitation of possibilities of implementation.

What is claimed is:

1. An apparatus for the fumigation under vacuum of granulated foodstuffs, comprising: a plurality of hermetically sealed tanks; means for the introduction to said tanks and removal from said tanks of the products to be treated; vacuum means common to all the tanks and including a vacuum pump, a vacuum pipeline, branches of the vacuum pipeline to each tank, corresponding opening and closing valves for the tanks, and a dry filter fitted in said vacuum pipeline adjacent the intake side of the pump; and means for introducing fumigants into the interior of said tanks.

2. An apparatus in accordance with claim 1, including a line for the ventilation of the product in the interior of the tanks, which line comprises: a ventilation pipeline for the suction of air, common to all the tanks; a dry filter in one end of said ventilation pipeline open to the exterior, the other end being in communication with the outlet of the vacuum pump; spherical valves situated immediately adjacent both ends of the ventilation pipeline; corresponding branches for the entry of air into each of the tanks; associated valves connected between each branch and each tank; and an outlet to the exterior with a corresponding valve situated immediately adjacent the pump connection in order to permit the exit of the air to the exterior.

3. An apparatus in accordance with the claim 1, wherein said means for introducing fumigants comprises: a fumigant container; an element for measuring and vaporizing fumigants and communicating with said fumigant container; and a fumigant pipeline connected to said measuring and vaporizing element, and to each tank, by means of branches fitted with membrane valves for the selected introduction of the fumigant which, once it is in the interior of the tank, can be recirculated under vacuum by closing said membrane valves and opening the valves associated with the vacuum and ventilation pipelines, there thus being established a circuit of recirculation under vacuum of the fumigant.

* * * * *